(12) United States Patent  (10) Patent No.: US 8,949,742 B2
Molesky et al.  (45) Date of Patent: Feb. 3, 2015

(54) COMPRESSING TREE DIAGRAMS (71) Applicant: Oracle International Corporation, Redwood Shores, CA (US)

(72) Inventors: Lory Molesky, Lexington, MA (US); Benjamin L. Moroze, Lexington, MA (US); Kris Hanson, Stoneham, MA (US)

(73) Assignee: Oracle International Corporation, Redwood Shores, CA (US)

( * ) Notice: Subject to any disclaimer, the term of this patent is extended or adjusted under 35 U.S.C. 154(b) by 239 days.

(21) Appl. No.: 13/688,010

(22) Filed: Nov. 28, 2012

(65) Prior Publication Data
US 2014/0095972 A1  Apr. 3, 2014

Related U.S. Application Data (63) Continuation of application No. 13/630,752, filed on Sep. 28, 2012.

(51) Int. Cl.
*G06F 3/0484* (2013.01)
*G06F 17/21* (2006.01)

(52) U.S. Cl.
CPC .................................. *G06F 17/211* (2013.01)
USPC ........... 715/853; 715/810; 715/833; 715/864; 715/863; 715/765; 345/169; 345/173

(58) Field of Classification Search
CPC ... G06F 1/1626; G06F 3/0481; G06F 3/0482; G06F 9/44543; G06F 9/4443; G06F 3/00; G06F 3/01; G06F 3/041; G06F 3/048; G06F 3/0484; G06F 3/04847; G06F 3/04883; G06F 3/0488
USPC ......... 715/764, 765, 835, 853, 864, 810, 815, 715/833, 863; 345/169, 173
See application file for complete search history.

(56) References Cited

U.S. PATENT DOCUMENTS 5,619,632 A * 4/1997 Lamping et al. ............... 345/441
5,736,974 A * 4/1998 Selker ............................ 715/862
5,786,820 A * 7/1998 Robertson ..................... 715/853

(Continued)

OTHER PUBLICATIONS

Oracle Application Server Quick Administration Guide; 10g Release 2 (10.1.2) Figures 2 and 3. Copyright 2003, 2005; 10 pages.

(Continued)

*Primary Examiner* — Xiomar L Bautista
(74) *Attorney, Agent, or Firm* — Trellis IP Law Group, PC (57) ABSTRACT

A system and method for adjusting a displayed visualization, such as a tree diagram. An example method includes providing a first mechanism for facilitating adjusting spacing between plural leaf nodes of a visualization by a first factor and providing a signal indicative of the first factor in response thereto; and employing a second mechanism to display an updated visualization in response to the signal, wherein spacing between leaf nodes of the updated visualization is adjusted relative to the initial visualization based on the signal, such that a region defined by a group of leaf nodes, whose spacing therebetween has been adjusted, is shrunk or enlarged based on the first factor. In an illustrative embodiment, the example method further includes adjusting the spacing between leaf nodes so that leaf nodes overlap each other.

20 Claims, 9 Drawing Sheets

(56) References Cited

U.S. PATENT DOCUMENTS

| | | | | |
|---|---|---|---|---|
| 6,259,451 | B1* | 7/2001 | Tesler | 345/419 |
| 8,010,575 | B2* | 8/2011 | Heer et al. | 707/803 |
| 8,332,782 | B1* | 12/2012 | Chang et al. | 715/853 |
| 8,584,047 | B2* | 11/2013 | Athans et al. | 715/854 |
| 8,640,045 | B2* | 1/2014 | Ording et al. | 715/779 |
| 8,677,279 | B2* | 3/2014 | Gan et al. | 715/854 |
| 2005/0273730 | A1* | 12/2005 | Card et al. | 715/853 |
| 2007/0162859 | A1* | 7/2007 | Yakowenko et al. | 715/733 |
| 2012/0036484 | A1* | 2/2012 | Zhang et al. | 715/853 |
| 2013/0332891 | A1* | 12/2013 | Schmitlin et al. | 715/853 |

OTHER PUBLICATIONS

Oracle Enterprise Manager Concepts; 10g Release 5 (10.2.0.5) See 'System Topology' specifically figures 6-3 and 6-4. Copyright 2009; 9 pages.

Oracle Enterprise Manager Concepts; 11g Release (11.1.0.1) Topology Viewer Figure 6-13. Copyright 2011; 40 pages.

Chita, Christian; Hierarchy Visualization; downloaded circa Aug. 16, 2012; 38 pages.

* cited by examiner

COMPRESSING TREE DIAGRAMS

CROSS REFERENCES TO RELATED APPLICATIONS

This application is related to the following application, U.S. patent application Ser. No. 13/630,752, entitled INTERACTIVE TOPOLOGICAL VIEWS OF COMBINED HARDWARE AND SOFTWARE SYSTEMS, filed on Sep. 28, 2012, which is hereby incorporated by reference, as if set forth in full in this specification:

BACKGROUND

The present application relates to software and more specifically to user interface designs and methods for manipulation of information visualizations, such as tree diagrams.

Information visualization may be any process involving graphically representing data according to a method or scheme. A graphical representation of data, such as a tree diagram, resulting from an information visualization technique, is often called an information visualization, or simply a visualization. Tree diagrams, also called tree graphs, tree visualizations, or simply trees, often depict a hierarchy via plural nodes with one or more paths connecting a node to one or more other nodes arranged at different levels of the tree diagram.

Tree diagrams are employed in various demanding applications, including visualizations of corporate hierarchies (i.e., organizational charts), decision trees for analyzing corporate decision processes and outcomes, visualizations for solving probability problems, visualizations for analyzing computer problems, data structures, computer network structures, and so on. Such applications often demand efficient user interface mechanisms for enabling simultaneous viewing of data or labels presented by tree nodes and the overall tree structure.

Efficient mechanisms for enabling simultaneous viewing of both tree data and tree structure can be particularly important when viewing large tree diagrams. Large tree diagrams may be particularly difficult to efficiently display via relatively small displays of mobile devices, such as tablets and smartphones.

Conventionally, user interface controls for zooming and panning are employed to facilitate viewing large tree diagrams. However, large tree diagrams may be difficult to view via a given display while also viewing information associated with particular tree nodes.

SUMMARY

An example method for adjusting a displayed visualization, such as a tree diagram, includes providing a first mechanism for facilitating adjusting spacing between plural nodes, such as leaf nodes, of a visualization by a first factor and providing a signal indicative of the first factor; and employing a second mechanism to display an updated visualization in response to the signal, wherein spacing between plural nodes of the updated visualization is adjusted relative to the initial visualization based on the signal, such that a region defined by a group of leaf nodes, whose spacing therebetween has been adjusted, is shrunk or enlarged based on the first factor.

In an illustrative embodiment, the example method further includes adjusting the spacing between leaf nodes of the group of leaf nodes so that one or more of the leaf nodes overlap one or more other leaf nodes by an amount indicated via the first factor. In this example, the factor represents a so-called leaf node compression factor.

The visualization may be a hierarchy visualization, such as a tree diagram, and the plural nodes may be leaf nodes of the tree diagram. The first mechanisms includes a computer programming function that is included in an Application Programming Interface (API). The API is callable via one or more functions of the second mechanism. The second mechanism may include a Graphical User Interface (GUI) incorporated as part of a software program, such as a database package or graphing program.

The example method further includes simultaneously adjusting spacing between plural leaf nodes of the tree diagram in accordance with the factor, such that plural leaf nodes of the tree diagram overlap by an amount based on the first factor, resulting in overlapping leaf nodes arranged in a leaf stack in response thereto. A first user interface control, such as a slider or other widget, provides a user option to set or adjust the first factor.

In addition, or alternatively, the first factor may be determined based on a zoom level characterizing a user interface display screen used by the second mechanism to display the tree diagram. The overlapping leaf nodes may include a group of sibling leaf nodes. The step of simultaneously adjusting leaf node spacing may further include shrinking a size of a region occupied by the overlapping leaf nodes when the first factor indicates compression, and increasing a size of a region occupied by the overlapping leaf nodes when the first factor indicates expansion, by decreasing or increasing spacings and/or overlap between overlapping leaf nodes, respectively in accordance with the first factor.

Spacings between parent nodes may be adjusted in accordance with a second factor. A second slider may be used to generate an input to the first mechanism, which then generates computer instructions for reducing parent node spacings in accordance with the second factor specified via the second slider. Alternatively, or in addition, the second factor and spacing between parent nodes may automatically be adjusted in accordance with spacing adjustments made to leaf nodes.

In another illustrative embodiment, transparency of leaf nodes in a stack of leaf nodes is adjustable, and leaf nodes of the stack may be sorted in accordance with a first criterion. Furthermore, sizes of leaf nodes may be adjusted according to a second criterion. Text of leaf nodes may be partly occluded by other overlapping leaf nodes, or in the case of high priority leaf nodes, overlap may be limited in accordance with the size of a text string in a leaf node.

Hence, certain embodiments discussed herein may facilitate reducing screen space occupied by a visualization, such as a tree diagram, by selectively reducing spacing and overlap between leaf nodes. This enables large tree diagrams to be compactly displayed via small screens, thereby enabling a user to simultaneously view content of nodes and to view the overall structure of the tree diagram.

A further understanding of the nature and the advantages of particular embodiments disclosed herein may be realized by reference of the remaining portions of the specification and the attached drawings.

DETAILED DESCRIPTION OF EMBODIMENTS

For the purposes of the present discussion, a hierarchy visualization may be any visualization that is adapted to illustrate a hierarchy or hierarchal relationship between data or data objects. A hierarchy may be any arrangement of data, where different data in the arrangement may exhibit superior or subordinate relationships with other data. A hierarchy may refer to a displayed representation of data objects or may refer to data and accompanying relationships existing irrespective of the representation. For example, an enterprise hierarchy, e.g., which may be displayed via an organizational chart (also called org chart) may be any power structure or position structure defining powers or privileges of personnel for an organization.

A tree diagram may be any diagram or graph that graphically depicts data and any accompanying hierarchal relationships among the data via two or more interconnected nodes, wherein one or more of the nodes may be interconnected to one or more other nodes via a path or link. The nodes of a tree diagram may correspond to data objects, and paths, also called links, and may facilitate indicating hierarchal relationships between data objects. A node that is connected to a subordinate node in a hierarchy depicted by a tree diagram is called a parent node. A subordinate node of a parent node is called a child node. A node that is connected to a parent node and has no child nodes is called a leaf node, or simply a leaf. Accordingly, various types of tree diagrams exist, including but not limited to biositemap diagrams, cluster diagrams, network diagrams, cone trees, multitrees, polyarchy visualizations, and so on.

For clarity, certain well-known components, such as hard drives, processors, operating systems, power supplies, routers, Internet Service Providers (ISPs), and so on, have been omitted from the figures. However, those skilled in the art with access to the present teachings will know which components to implement and how to implement them to meet the needs of a given implementation.

Figure 1:
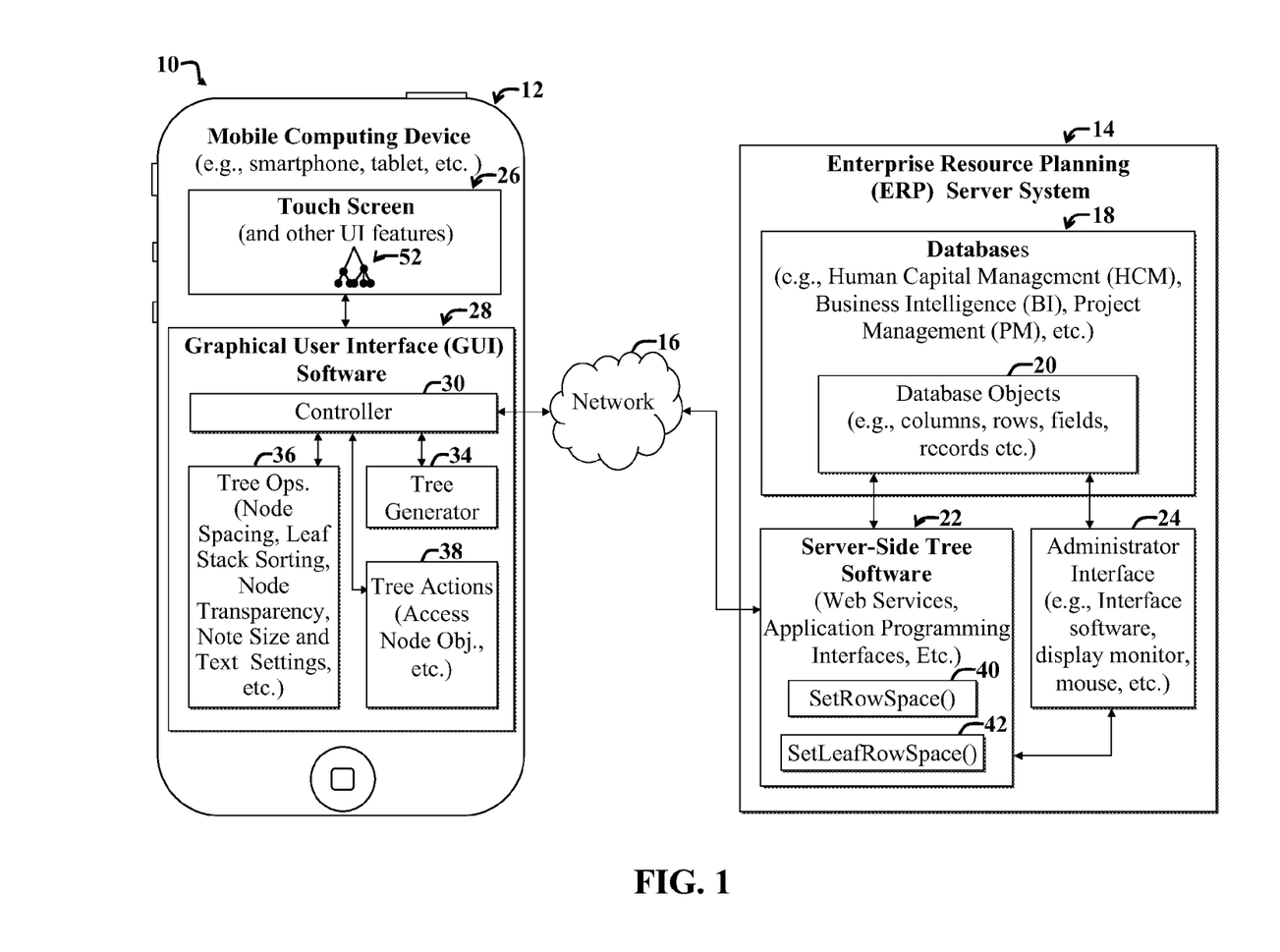
FIG. 1 is a diagram illustrating an example enterprise computing environment and accompanying system for facilitating adjusting spacing and overlap between leaf nodes of a visualization, such as a tree diagram.

FIG. 1 is a diagram illustrating an example enterprise computing environment and accompanying system 10 for facilitating adjusting spacing and overlap between leaf nodes of a visualization, such as a tree diagram 52 or other hierarchy visualization. The example system 10 includes a mobile computing device 12 in communication with an Enterprise Resource Planning (ERP) server system 14 via a network 16, such as the Internet. The ERP system 14 includes various databases 18, which store database objects 20.

An object, such as a data object, may be any grouping of or encapsulation of data and/or functionality. Examples of objects include classes or structures implemented via object-oriented programming languages; tables, rows, or records of a database; and so on. A representation of an object, i.e., a displayed object, may be displayed via graphical depiction, such as a node of a tree diagram, a menu item, dialog box, personnel icon, and so on. The graphical depiction of an object may also be called an object, a displayed object, or a node.

Server-side software 22, such as web services, Application Programming Interfaces (APIs), and so on, may communicate with the database objects 20 to selectively employ data thereby, such as to facilitate implementation of various software applications, which may include server-side and client-side applications. Generally, server-side implementations involve running applications on the ERP server 14 in response to a request from a client, such as the mobile computing device 12. The server-side application may then send data and/or instructions back to the client device 12. In client-side implementations, software may be downloaded to the mobile computing device 12 and executed locally on the device 12.

The example ERP server system 14 includes an administrator user interface 24, which may include hardware and software functionality for enabling an administrator to make changes to various components of the ERP server system 14, such a settings, installed software, and so on.

The mobile computing device 12 represents an example client device that communicates with server-side tree software 22. Note that client devices other than mobile computing devices may be employed without departing from the scope of the present teachings.

The mobile computing device 12 employs a relatively small touch screen 26 in communication with Graphical User Interface (GUI) software 28, which is adapted to facilitate displaying one or more tree diagrams 52 via the touch screen 26. The GUI software 28 may be any software application or component, such as a spread sheet program, graphing software, and so on, that is adapted to facilitate displaying graphical user interface features and/or data, such as graphs, menu items, dialog boxes, and so on.

The example GUI software 28 includes a controller 30 in communication with a tree generator 34, a tree actions module 38, and a tree operations module 36. The controller 30 includes computer code for coordinating inputs and outputs to and from the modules 34-38 and interfacing the GUI software 28 and accompanying modules 34-38 with the server-side tree software 22.

In an example operative scenario, a user employs the mobile computing device 12 to browse to a website hosted by the ERP server system 14, which provides access to the server-side tree software 22 and accompanying database objects 20. The controller 30 may facilitate downloading database objects 20 from the ERP server system 14 and server-side tree software 22 for use in constructing a tree diagram 52 to be displayed via the touch screen 26.

In the present example operative scenario, the GUI software 28 selectively downloads database objects 20 from the ERP server system 18. The tree generator 34 then employs client-side tree-generating software to construct a tree diagram in accordance with instructions included in the controller 30 and input from the touch screen 26. Initial spacing between leaf nodes and rows of columns of a tree diagram may be set by the GUI software 28. The controller 30 may facilitate implementing GUI components and user interface controls to provide user options to adjust leaf node spacing and/or row or column spacing, as discussed more fully below. Alternatively, or in addition, leaf node spacing and row or column spacing is automatically adjusted, such as in accordance with a zoom level associated with a tree diagram.

For the purposes of the present discussion, a user interface control may be any displayed element or component of a user interface display screen, which is adapted to enable a user to provide input, view data, and/or otherwise interact with a user interface. Additional examples of user interface controls include buttons, drop down menus, menu items, tap-and-hold functionality, and so on. Similarly, a user interface control signal may be any signal that is provided as input for software, wherein the input affects a user interface display screen and/or accompanying software application associated with the software. Touch input may be any input, such as input via a gesture, provided to a computing device via a touch-sensitive display. A gesture may be any movement that involves motion to trigger a signal to control or otherwise affect a user interface display screen.

For the purposes of the present discussion, a zoom level of a user interface display screen may refer to a magnification state of a visualization, such as the tree diagram 52 displayed via the user interface display screen 26. A tree diagram that is fully magnified is said to be fully zoomed in. Similarly, a tree diagram that is fully uniformly shrunk or scaled is said to be fully zoomed out.

Spacing between nodes is said to be reduced if centers of the nodes are moved closer together. Accordingly, overlapping leaf nodes, whose amount of overlap between adjacent nodes is increased, are said to exhibit reduced spacing therebetween.

Spacing adjustments responsive to input from a logical zoom module or functionality are said to be implemented via logical zoom. For example, when a diagram is zoomed out, leaf node spacing may be automatically reduced via logical zoom functionality. Note that zoom level and window resizing functionality may be coupled, such that resizing of a window results in an adjustment to zoom level and/or leaf node spacing.

Key functionality for adjusting spacing between leaf nodes of a tree diagram may be included in a SetRowSpace( ) function 40 included in the server-side tree Application Programming Interface (API) 22. Functionality for adjusting spacing between rows or columns of a tree diagram may be included in a SetLeafRowSpace( ) 42 function of server-side tree API 22. The functions 40, 42 may be called remotely via the tree generator 34 and controller 30 as needed in response to certain user input, or automatically in accordance with instructions included in the controller 30. Alternatively, the functions 40, 42 may be downloaded to the mobile computing device 12 and run client-side.

Furthermore, note that while the example GUI software 28 is shown included in the mobile computing device 12, implementations are not limited thereto. For example, the GUI software 28 may be incorporated into the server-side tree software 22 and run on the server 14 as a server-side application. The server side application may be run server-side and viewed client-side via a browser software running on the mobile computing device 12.

In the present example embodiment, various GUI modules 34-38 include computer code for implementing functionality for adjusting how a tree diagram is displayed via the touch screen 26. In certain cases, the tree diagram 52 to be displayed via the relatively small touch screen 26 may be too large to be viewed in it's entirety via the touch screen 52 without modifications to the tree diagram 52 implemented via the GUI modules 34-38. Example tree operations, which may be implemented in part via the tree operations module 36, include adjusting leaf node spacing, sorting stacks of leaf nodes, adjusting transparency of leaf nodes, adjusting leaf node size, adjusting text appearance (e.g., text transparency) associated with leaf nodes, and so on, as discussed more fully below. Example tree actions 38 include triggering display of additional details of a data object represented via a node of the tree diagram 52 in response to certain user input (such as a tap gesture applied to a displayed node), and so on.

Figure 2:
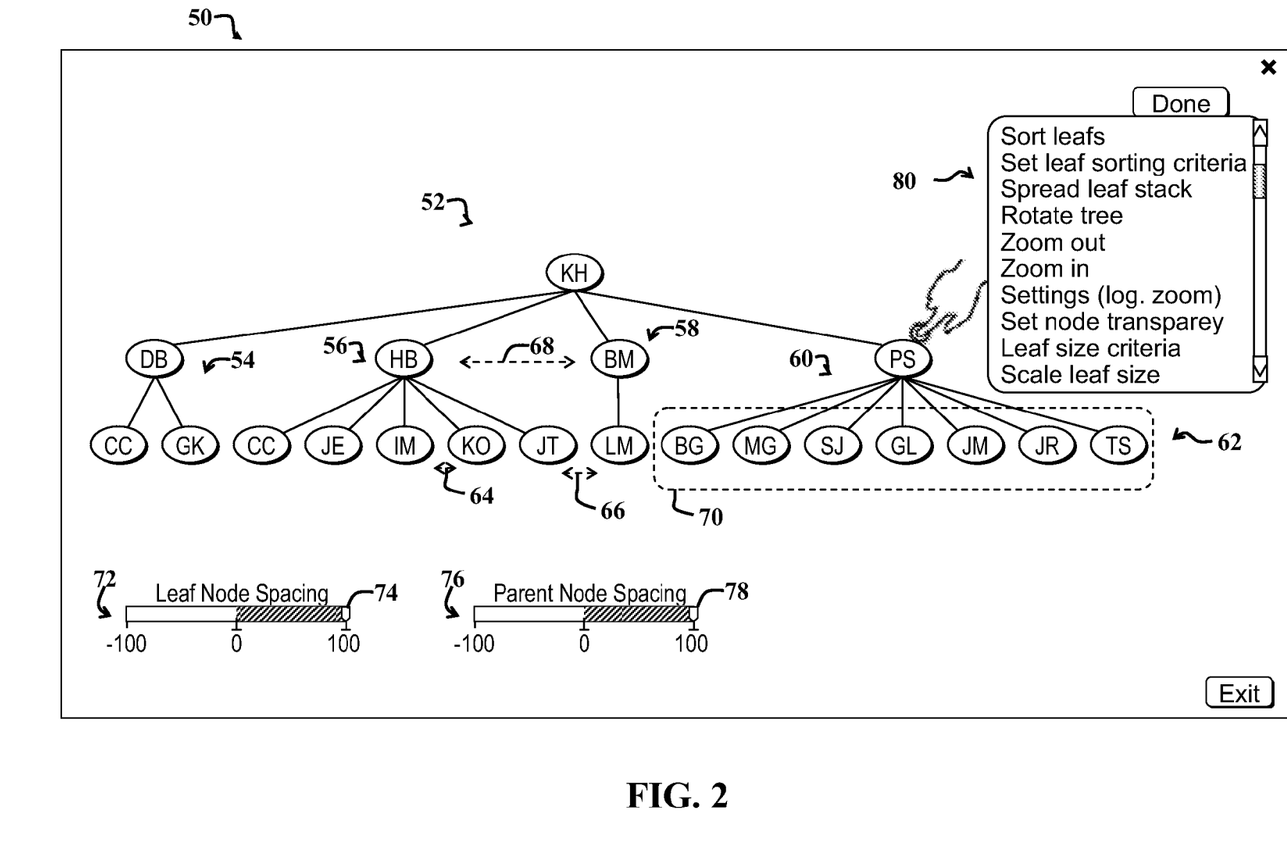
FIG. 2 shows a first example user interface display screen illustrating a first tree diagram and slider bars for adjusting node spacing and overlap.

FIG. 2 shows a first example user interface display screen 50 illustrating a first tree diagram 52 and sliders 72, 76 for adjusting node spacing and overlap. One or more additional sliders (not shown) may be included for adjusting row spacing, branch lengths (e.g., via adjustments to node link lengths), and so on, without departing from the scope of the present teachings.

For the purposes of the present discussion, a user interface display screen may be any software-generated depiction presented on a display, such as the touch screen 26 of FIG. 1. Examples of depictions include windows, dialog boxes, displayed tables, and any other graphical user interface features, such as user interface controls, presented to a user via software, such as a browser.

The sliders 72, 76, represent examples of slider user interface controls, also called slider bar controls. For the purposes of the present discussion, a slider user interface control may be any user interface control with a graphic that can be positioned or moved to change values or factors corresponding to positions of the graphic. A slider bar may be any movable graphic of a slider user interface control.

The example tree diagram 52 includes various labeled nodes, including a top node (KH) and nodes of various subtrees 54-60, also called tree families herein. Each of the tree families 54-60 include a parent node (i.e., DB, HB, BM, PS), which is a parent to one or more leaf nodes 62. For the purposes of the present discussion, a leaf node of a visualization may be any childless node of a visualization that is directly connected to a parent node, such as via a path or link. Accordingly, leaf nodes have no children. A node may be any graphical representation of an object in a visualization.

Note that while the various nodes of the tree diagram 52 are labeled, such as by initials of corporate personnel in an organizational chart, embodiments are not limited thereto. For example, node labels may include larger labels that may be positioned below or adjacent to a node, as opposed to within the confines of a boundary associated with a node. Labels, such as text, corresponding to nodes may also be organized under a stack of nodes, such as under a leaf stack. For the purposes of the present discussion, a leaf stack may be any group of overlapping leaf nodes. A first leaf node is said to overlap a second leaf node when a boundary of the first leaf node appears to encroach on a boundary of the second leaf node.

In the present example embodiment, node labels included within the nodes of the tree diagram 52 are text strings. However, note that other types of labels, such as graphical symbols or icons, may be employed instead of or in addition to text strings, without departing from the scope of the present teachings. For the purposes of the present discussion, a text string may be any sequence of characters, including white spaces, such as may be included in, adjacent to, or otherwise in association with a tree node.

Each parent node (i.e., DB, HB, BM, PS) of the tree families 54-60 includes child nodes of the corresponding parent node. The child nodes in this case are leaf nodes 62. Child leaf nodes that share a common parent are called sibling leaf nodes.

A first slider 72 and accompanying slider bar 74 enable a user to adjust spacing between sibling leaf nodes 62. An optional parent node spacing slider 76 and accompanying slider bar 78 are adapted to enable user adjustments to spacing 68 between parent nodes 54-60. Note that in certain implementations, parent node spacing 68 is automatically adjusted in response to adjustments made to leaf node spacing 64. Similarly, spacing 66 between leaf node families may be automatically adjusted, or a slider or other user interface control may be employed to enable user adjustments thereto.

Note that while sliders 72, 76 are provided to facilitate node spacing adjustments, that other types of user interface controls may be employed to facilitate such spacing adjustments. For example, in certain implementations, certain touch input, such as a horizontal swipe across a group of sibling leaf nodes, may act to reduce or expand spacing between the sibling leaf nodes of a common parent node. Exact user interface mechanisms for implementing adjustments to leaf node spacing are implementation specific and may vary depending upon the needs of a given implementation, without departing from the scope of the present teachings.

In the present example embodiment, spacing between leaf nodes 62 of the tree diagram 52 are at a maximum, as indicated by the position of the slider bar 74 of the leaf node spacing slider 72. A user may drag the slider 74 to the left to globally reduce spacing between leaf nodes 62. When leaf node spacing is reduced, regions occupied by sibling leaf nodes, such as the region 70 of the far right tree family 60, is shrunk or compressed. Accordingly, the act of reducing leaf node spacing is said to compress leaf nodes to the extent that the area of the region 70 occupied by sibling leaf nodes is reduced, as discussed more fully below with reference to FIGS. 3-5. Similarly, when spacing between sibling leaf nodes is increased, the size of the region 70 increases.

An example leaf operations menu 80 may be displayed in response to certain user input, such as a tap-and-hold gesture applied to a parent node (PS) of the far right leaf node 60. The menu 80 may provide various user options, such as an option to trigger leaf sorting based on a criterion, an option to set the leaf sorting criterion (e.g., alphabetical, priority or importance based, and so on), and option to spread a leaf stack, an option to rotate a tree (e.g., by 90 degrees counterclockwise), an option to zoom out or zoom in on the tree diagram 52 or selected portion thereof (e.g., the right most tree family 60), an option to configure tree settings (e.g., enabling or disabling logical zoom), an option to set node transparency (e.g., in accordance with a sort order or priority or importance level of a leaf node), an option to set leaf sizing criteria, an option to scale leaf sizes, and so on. Additional or fewer user options may be provided without departing from the scope of the present teachings.

When the menu 80 is displayed and a user option is selected therefrom, an additional dialog box or user interface display screen may appear, whereby a user may enter additional data, settings, and so on. With reference to FIGS. 1 and 2, once a user option is selected and desired data or settings are entered, a signal may be sent to the controller 30 (e.g., from the touch screen 26), which may then call routines or functions provided by the various modules 34-38 and/or by the server-side tree software 22, as needed to implement changes to the displayed tree diagram 52 in accordance with the user input.

Note that to the extent that minimum spacing 108 between parent nodes (DB, HB, BM, PS) is determined by areas or regions occupied by child nodes of each parent node at each level of the hierarchy 52, reduction in spacing between child nodes of a parent may trigger automatic reduction in spacing between parent nodes or nodes at the next higher level. Details of spacing adjustments between parent nodes are implementation specific. In certain implementations, no spacing adjustment between parent nodes is performed.

Figure 3:
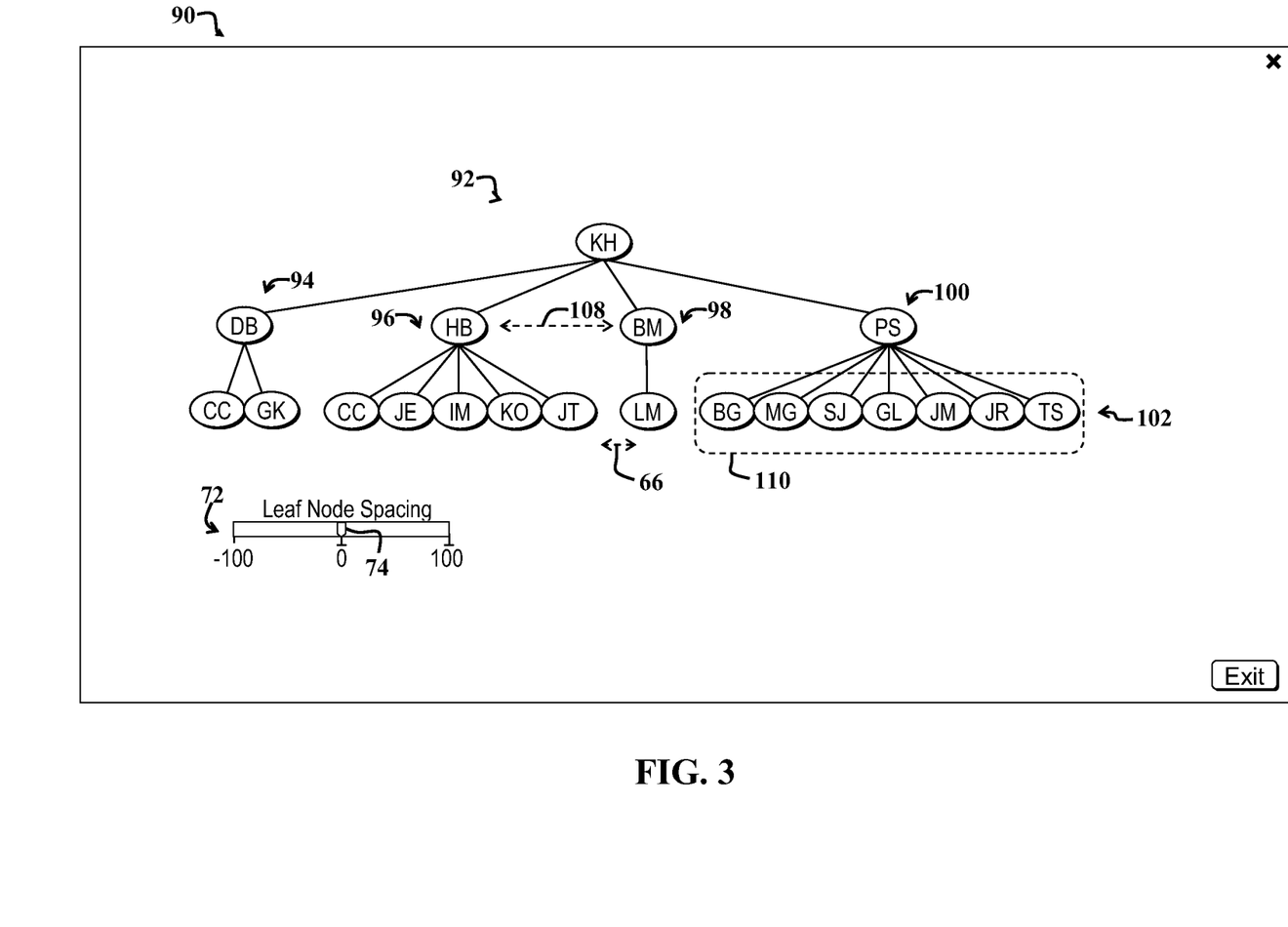
FIG. 3 shows a second example user interface display screen illustrating the tree diagram of FIG. 2 after a slider bar is adjusted to reduce leaf node spacing such that sibling leaf nodes abut each other.

FIG. 3 shows a second example user interface display screen 90 after spacing between leaf nodes of the tree diagram 52 of FIG. 2 has been reduced, resulting in a first updated tree diagram 92. Spacing between so-called compressed leaf nodes 102 has been adjusted, e.g., by moving the slider bar 74 of the slider 72. As indicated by the zero position of the slider bar 74 of the slider 72, spacing between leaf nodes 102 has been adjusted so that adjacent sibling leaf nodes 102 abut each other. Accordingly, a reduced-sized region 110, which has been reduced relative to the corresponding region 70 of FIG. 1, is occupied by sibling leaf nodes of an adjusted tree family 100.

Similarly, since the slider 72 is a global user interface control in the present example embodiment, spacing between leaf nodes of other tree families 94, 96, 98 is also adjusted so that sibling leaf nodes abut each other. Note that spacing 108 between parent nodes (e.g., parent node HB and parent node BM) may be automatically proportionally reduced in accordance with adjustments in spacing between leaf nodes 102. Note that in the present example embodiment, tree family spacing 66 remains constant after adjustment to leaf node spacing. However, the spacing 66 may also be adjusted in certain implementations, without departing from the scope of the present teachings.

Figure 4:
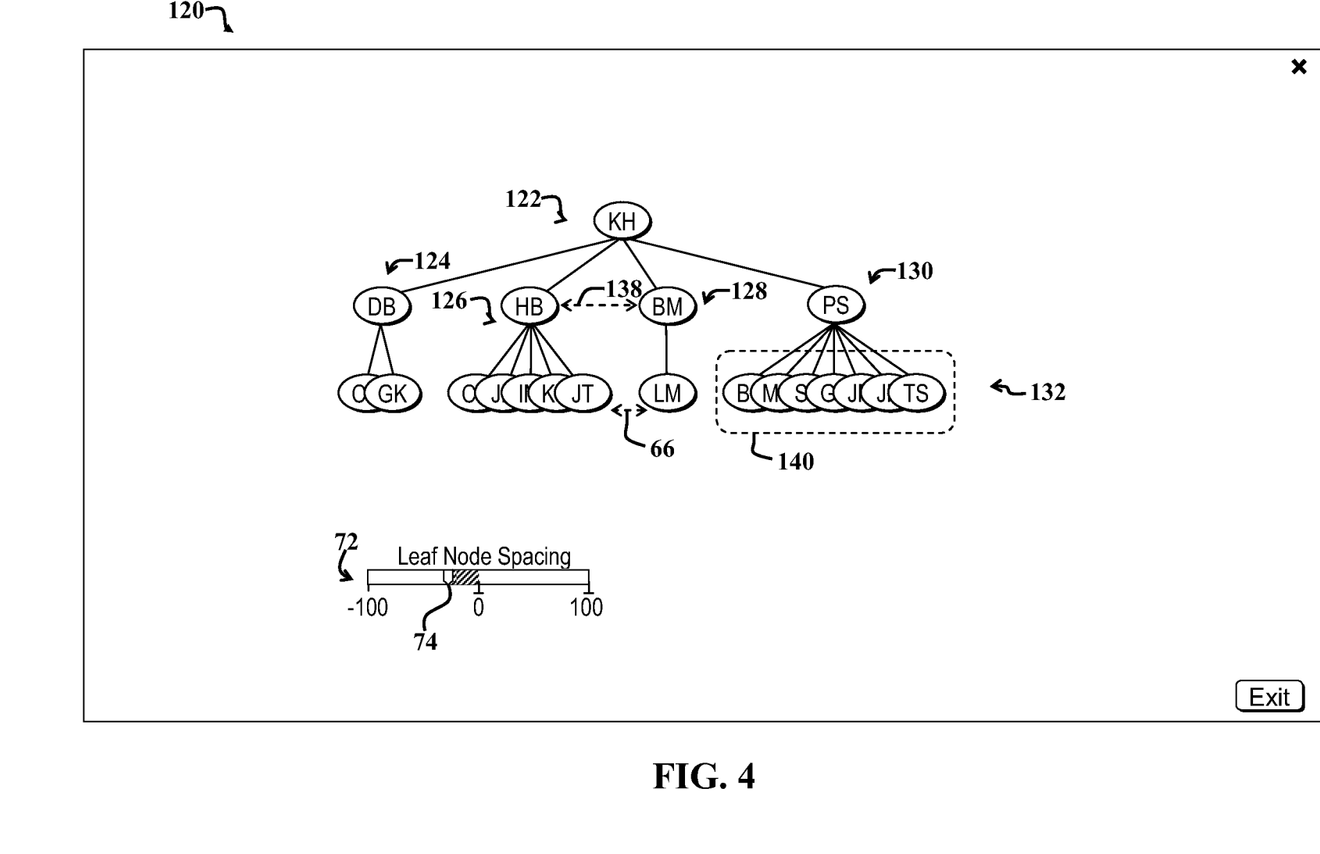
FIG. 4 shows a third example user interface display screen illustrating the tree diagram of FIG. 3 after the slider bar is adjusted to further reduce leaf node spacing such that sibling leaf nodes partly overlap.

FIG. 4 shows a third example user interface display screen 120 after further leaf node compression is applied to the first adjusted tree diagram 92 of FIG. 3, resulting in a second adjusted tree diagram 122 shown in FIG. 4. The second adjusted tree diagram 122 includes overlapping leaf nodes 132.

Note that the slider bar 74 of the slider 72 of FIG. 4 has been positioned left of the zero marker. In the present example embodiment, slider bar positioning to the left of the zero maker indicates node overlap. The position of the slider bar 74 corresponds to a factor specifying a degree of overlap between sibling leaf nodes. For example, if the slider bar 74 is positioned at negative fifty, then adjacent sibling leaf nodes will overlap each other by a factor of 0.5, such that half of a node may be overlapped by another adjacent node.

Similarly, when the slider bar 74 is positioned to the right of the zero marker, the factor set by the slider 72 determines a distance between centers of adjacent sibling leaf nodes when the leaf nodes do not overlap. The factor may be sent, via a signal, to the controller 30 and tree generator 34 of FIG. 1, which may then call appropriate API functions (e.g., SetLeafRowSpace( ) 42) to adjust leaf node spacing of the displayed tree diagram 122 accordingly.

In implementations where a smaller node overlaps a larger node, the factor may apply to the percentage of overlap of the smaller node relative to the larger node. For example, when leaf node spacing is set at negative fifty percent, half of the depicted boundary of the smaller leaf node may overlap or be overlapped by an adjacent larger node.

As with FIG. 3, the spacing 66 between updated tree families 124-130 may remain constant. Similarly, parent node spacing 138 may change in accordance with reductions in spacing between sibling leaf nodes 132. Furthermore, regions (e.g., updated region 140) occupied by sibling leaf nodes is reduced by a factor corresponding to adjustments made to leaf node spacing.

Figure 5:
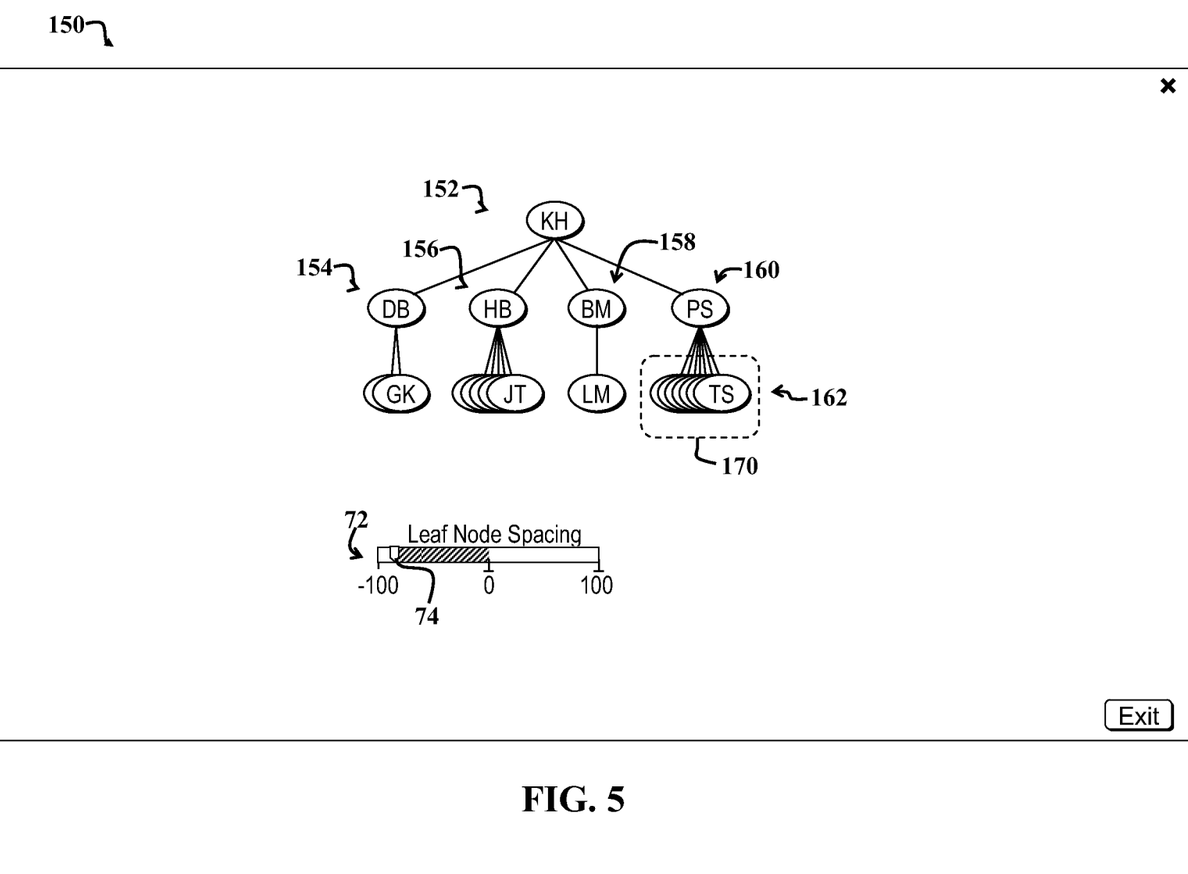
FIG. 5 shows a fourth example user interface display screen illustrating the tree diagram of FIG. 4 after the slider bar is adjusted to further reduce leaf node spacing such that sibling leaf nodes substantially overlap.

FIG. 5 shows a fourth example user interface display screen 150 illustrating a compressed version 152 of the tree diagram 122 of FIG. 4. The slider bar 74 of the slider 72 of FIG. 5 has been adjusted further to the left relative to the slider bar 74 of FIG. 4, thereby resulting in additional overlap between updated sibling leaf nodes 162. This results in reduced sibling leaf node footprint, as represented by a reduced-size region 170 relative to the corresponding region 140 of FIG. 4. Leaf node footprints of all of the updated tree families 154-160 have been shrunk in accordance with the reduced spacing and increased overlap between adjacent leaf nodes 162

Figure 6:
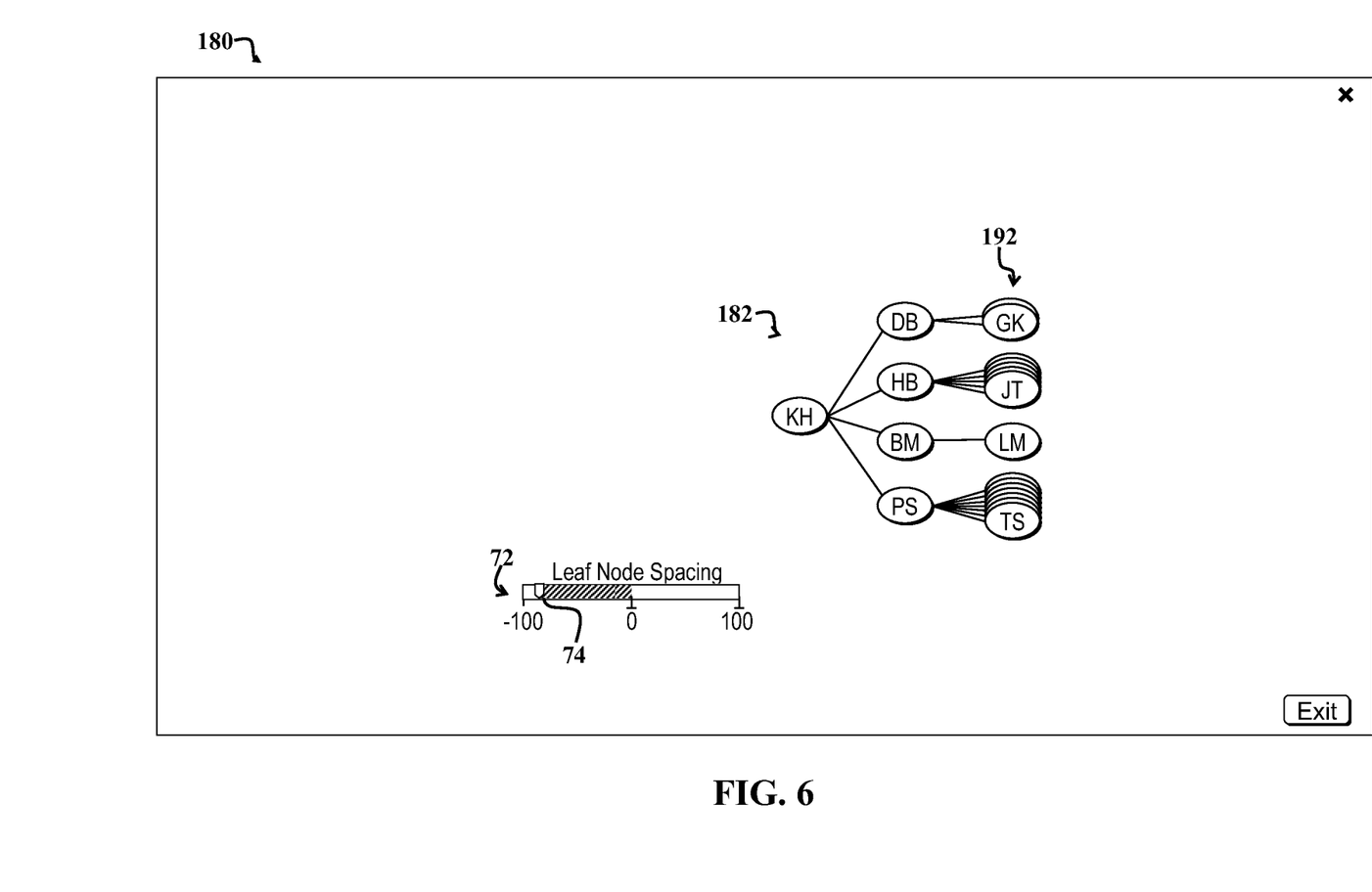
FIG. 6 shows a fifth example user interface display screen illustrating the tree diagram of FIG. 5 after counter clockwise rotation by ninety degrees.

FIG. 6 shows a fifth example user interface display screen 180 illustrating a rotated version 182 of the tree diagram 152 of FIG. 5. Rotation of the tree diagram 182 may be implemented in response to user input, e.g., via a menu option provided via the menu 80 shown in FIG. 2. The structure of the tree diagram 182 has been rotated counterclockwise by ninety degrees relative to the tree diagram 152 of FIG. 5, and individual nodes, such as rotated leaf nodes 192, have been adjusted accordingly.

Hence, various tree operations discussed herein, such as leaf node spacing adjustment, may apply to trees of various orientations, and such orientations may be changed depending upon the implementations. Exact tree orientation is implementation specific and may vary beyond that shown, without departing from the scope of the present teachings. For example, in certain implementations, trees may be oriented upside down, or leaf nodes may be arranged about the perimeter of a circle or other shape, and so on.

Figure 7:
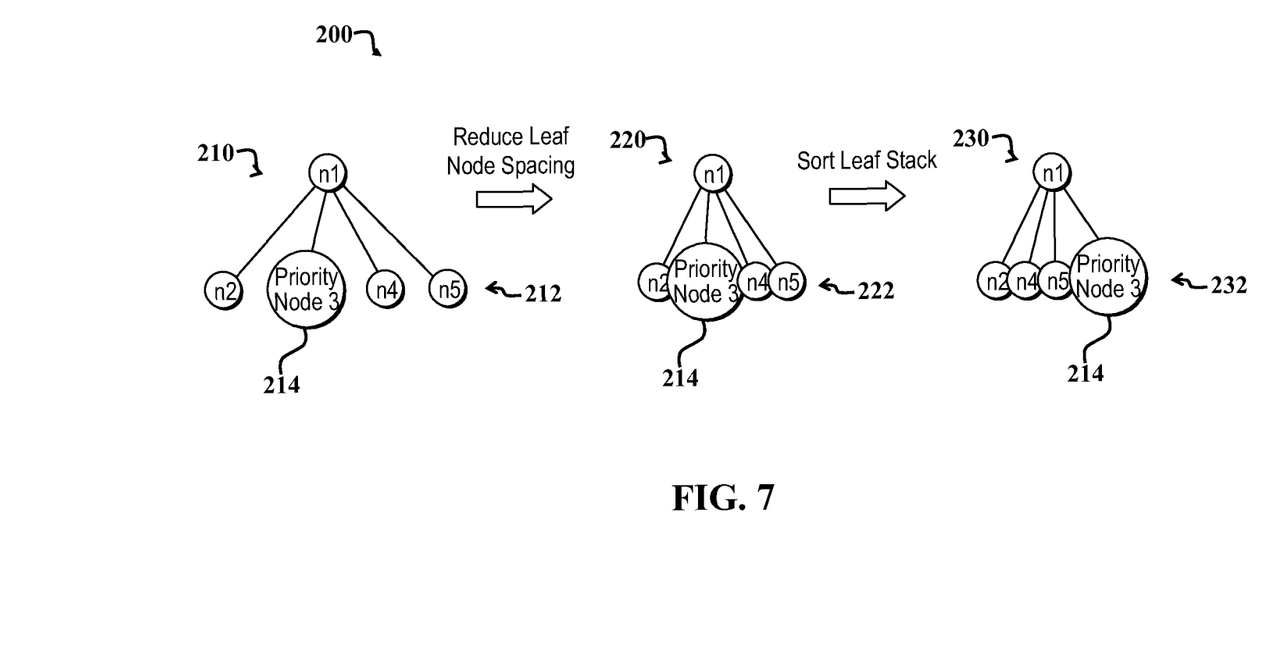
FIG. 7 shows an example sequence of operations on an example tree diagram, which may be implemented via the embodiments of FIGS. 1-7.

FIG. 7 shows an example sequence 200 of operations on an example tree diagram 210, which may be implemented via the embodiments of FIGS. 1-7. An initial tree diagram 210 of the sequence 200 includes a relatively large leaf node 214 among the leaf nodes 212.

The large leaf node 214 includes a relatively large amount of text, which would not fit within the small boundaries of other leaf nodes without the text being shrunk or abbreviated. Accordingly, the size of the boundary of the leaf node 214 has been adjusted to accommodate the text string "Priority Node 3." In certain implementations, the size of a leaf node is not necessarily adjusted based on the amount of text, i.e., the size of a text string, to be included within the boundaries of a node. For example, text in a node may be automatically abbreviated (or shrunk), based on a predetermined abbreviation scheme, to fit within the confines of a given node boundary.

In other implementations, the size of anode is scaled or adjusted in accordance with a priority or importance level assigned to a node. Such importance levels may be set, e.g., in response to user input provided via selection of an appropriate user option from the menu 80 of FIG. 2.

Spacing between adjacent sibling leaf nodes 222 in subsequent tree diagram 220 in the sequence 200 has been reduced relative to spacing between leaf nodes 212 of the initial tree diagram 210. Nodes n2 and n4 are shown overlapping the large leaf node 214 by a user-set (e.g., via a slider or other widget) or automatically set factor (e.g., in accordance with logical zoom settings) corresponding to a percentage overlap of the smaller nodes n2 and n4.

When determining the degree of overlap of adjacent nodes relative to the percentage of the region of a smaller node that is overlaps or is overlapped by a larger node, overlap between leaf nodes is said to be limited in accordance with node size.

A last tree diagram 230 of the sequence 200 illustrates results of a leaf node sorting operation performed on the previous tree diagram 220. In the present example, sorted leaf nodes 232 have been sorted in accordance with pre-set node priorities or importance levels. The pre-setting of node priorities may be user-set, e.g., via selection of an appropriate user option from the menu 80 of FIG. 2, or automatically set, e.g., via a rule coded into the computer code of the tree generator 34 of FIG. 2.

In the present example, the sorted leaf nodes 232 are sorted in order of increasing priority or importance level from left to right, such that node n2 is a lower priority node than node n4, which is a lower priority node than n5, which is a lower priority node than "Priority Node 3" 214.

In implementations where node priority or importance level determines node size, the sorted nodes 232 would appear has sorted in accordance with increasing node size, such that the leftmost node is the smallest node, and the rightmost node 214 is the largest node.

The sizes of leaf nodes may be scaled by a factor that is proportional to an associated priority level or importance value. Accordingly, in such cases, sorting of leaf nodes in accordance with importance or priority is equivalent to sorting the leaf nodes based on factors applied to scale the sizes of the leaf nodes.

Groups of sibling leaf nodes that overlap, such as the sibling leaf nodes 222 and 232, represent leaf stacks. The leaf nodes 232 are said to represent a sorted leaf stack.

Note that the transparency of all nodes or particular nodes may also be adjusted, e.g., via a user option selected via the menu 80 of FIG. 2. For example, in one implementation, text of higher priority nodes is not occluded by lower priority nodes, and text of higher priority nodes may be more opaque or darker than text of lower priority nodes. Alternatively, or in addition, higher priority nodes may not be overlapped at all by a lower priority node, and lower priority nodes and/or accompanying text thereof may be occluded by higher priority nodes.

In other implementations, the bodies of nodes are made partially transparent so that text of an underlying node can be viewed through the body of an overlapping node thereof. Exact details for implementing node transparency and accompanying text-string transparency are implementation specific and may vary, without departing from the scope of the present teachings.

In other implementations, text of a node is automatically abbreviated when the node is partially occluded by another node such that the other node would obscure text of the node being occluded. Accordingly, text of a first node may be automatically abbreviated when the first node is partly occluded by another second node.

However, when the second node occludes the first node beyond a predetermined percentage or factor, then the body of the occluding second node may be made partially transparent to enable viewing of abbreviated text of the first node. When the second node completely occludes the first node, the second node may be made completely opaque. Exact details for determining when a node is made transparent, or when a text string is abbreviated based on node overlap, are implementation specific and may vary, without departing from the scope of the present teachings.

Figure 8:
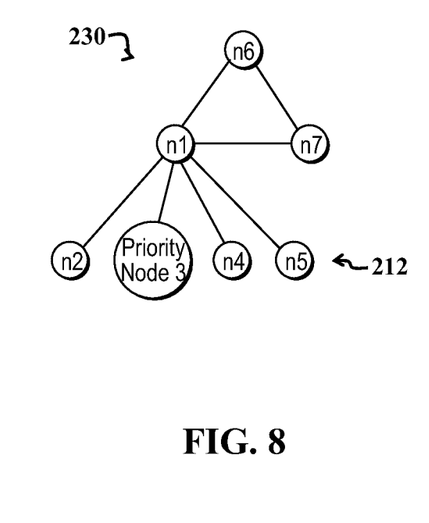
FIG. 8 shows an example tree diagram with a cycle, where leaf nodes of the tree diagram that are not part of the cycle may be compressed in accordance with the embodiments of FIGS. 1-8.

FIG. 8 shows an example tree diagram 230 with a cycle formed by nodes n1, n6, and n7, where leaf nodes 212 that are not part of the cycle may be compressed in accordance with the embodiments of FIGS. 1-8. Hence, systems and methods discussed herein for reducing leaf node spacing may apply to diagrams that also include cycles. However, in the present example embodiment, reduction in leaf node spacing is only applied to leaf nodes, e.g., the leaf nodes 212, which are not part of a cycle.

Figure 9:
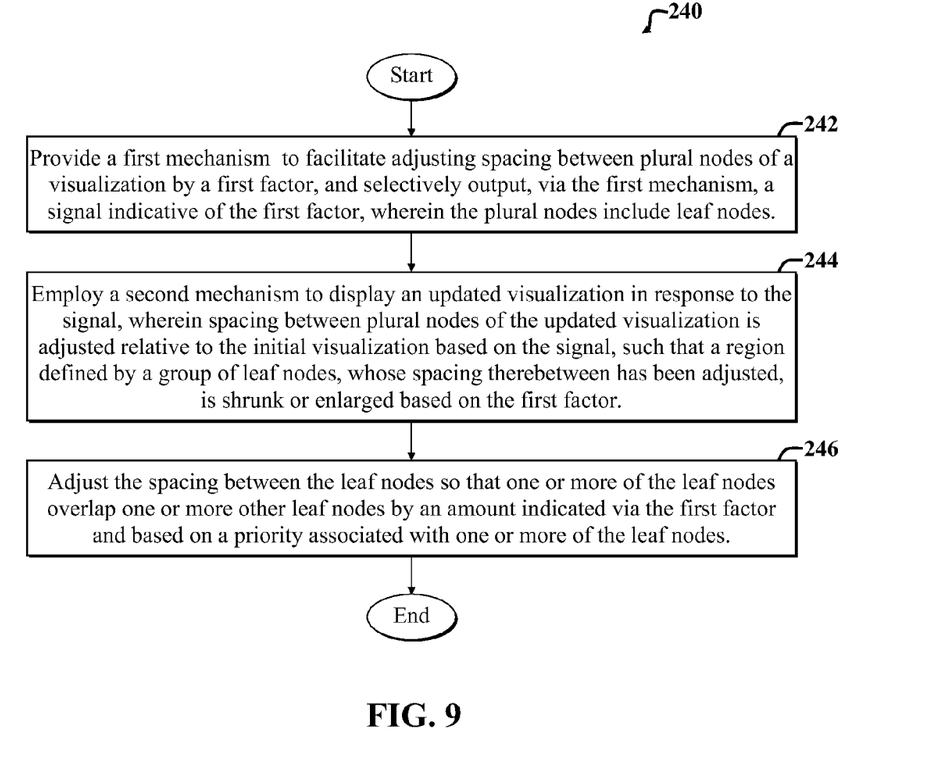
FIG. 9 is a flow diagram of an example method adapted for use with the embodiments of FIGS. 1-8.

FIG. 9 is a flow diagram of an example method 240 adapted for use with the embodiments of FIGS. 1-8. The example method 240 includes a first step 242, which involves providing a first mechanism (e.g., a function in an API) for adjusting spacing between plural nodes, such as leaf nodes, of a visualization by a first factor and providing a signal indicative of the first factor.

A second step 244 includes employing a second mechanism (e.g., GUI software) to display an updated visualization, such as an updated tree diagram, in response to the signal. Spacing between leaf nodes of the updated visualization is adjusted relative to the initial visualization based on the signal, such that a region defined by a group of leaf nodes, whose spacing therebetween has been adjusted, is shrunk or enlarged based on the first factor.

A third step 246 includes further adjusting the spacing between the plural nodes so that one or more of the plural nodes overlap one or more other nodes of the plural nodes by an amount indicated via the first factor and based on a priority associated with one or more of the leaf nodes.

Various steps of the method 240 may be omitted, modified, or augmented, without departing from the scope of the present teachings. For example, additional steps may include providing a user option to scale leaf node sizes in accordance with node priorities; providing a user option to sort a stack of overlapping sibling leaf nodes in accordance with a predetermined criterion, and so on.

Although the description has been described with respect to particular embodiments thereof, these particular embodiments are merely illustrative, and not restrictive. For example, while embodiments herein are primarily discussed with respect to software and methods for adjusting leaf node spacing of a leaf nodes of a tree diagram, embodiments are not limited thereto.

For example, while embodiments have been discussed with reference to hierarchal tree diagrams, embodiments are not limited thereto. For example, systems, software, and accompanying methods for facilitating compressing leaf nodes and adjusting spacing and overlap between nodes may be applied to other types of diagrams, such as path graphs, that also include nodes and connections between nodes. However, in path graph compression, those skilled in the art will appreciate that node overlap may not be desired in certain implementations, but nevertheless, node spacing may be reduced or expanded while preserving relative spacing between nodes in accordance with the present teachings.

Furthermore, leaf node compression can be applied to leaf nodes of some tree families and not others without departing from the scope of the present teachings. In addition, trees need not be organized with different horizontally or vertically arranged levels. For example, star graphs may be considered types of trees for the purposes of the present discussion.

Furthermore, other types of visualizations, such as sunburst visualizations, may include sections representative of leaf nodes, which may be overlapped in accordance with embodiments discussed herein, without departing from the scope of the present teachings.

Any suitable programming language can be used to implement the routines of particular embodiments including C, C++, Java, assembly language, etc. Different programming techniques can be employed such as procedural or object oriented. The routines can execute on a single processing device or multiple processors. Although the steps, operations, or computations may be presented in a specific order, this order may be changed in different particular embodiments. In some particular embodiments, multiple steps shown as sequential in this specification can be performed at the same time.

Particular embodiments may be implemented in a computer-readable storage medium for use by or in connection with the instruction execution system, apparatus, system, or device. Particular embodiments can be implemented in the form of control logic in software or hardware or a combination of both. The control logic, when executed by one or more processors, may be operable to perform that which is described in particular embodiments.

Particular embodiments may be implemented by using a programmed general purpose digital computer, by using application specific integrated circuits, programmable logic devices, field programmable gate arrays, optical, chemical, biological, quantum or nanoengineered systems, components and mechanisms may be used. In general, the functions of particular embodiments can be achieved by any means as is known in the art. Distributed, networked systems, components, and/or circuits can be used. Communication, or transfer, of data may be wired, wireless, or by any other means.

It will also be appreciated that one or more of the elements depicted in the drawings/figures can also be implemented in a more separated or integrated manner, or even removed or rendered as inoperable in certain cases, as is useful in accordance with a particular application. It is also within the spirit and scope to implement a program or code that can be stored in a machine-readable medium to permit a computer to perform any of the methods described above.

As used in the description herein and throughout the claims that follow, "a", "an", and "the" includes plural references unless the context clearly dictates otherwise. Also, as used in the description herein and throughout the claims that follow, the meaning of "in" includes "in" and "on" unless the context clearly dictates otherwise.

Thus, while particular embodiments have been described herein, latitudes of modification, various changes, and substitutions are intended in the foregoing disclosures, and it will be appreciated that in some instances some features of particular embodiments will be employed without a corresponding use of other features without departing from the scope and spirit as set forth. Therefore, many modifications may be made to adapt a particular situation or material to the essential scope and spirit.

We claim:

1. A method for facilitating adjusting a displayed representation of a visualization, the method comprising:
receiving a visualization including a plural of nodes each having a first size and spacing therebetween configured to allow the visualization to be contained within a region of a display;
providing a first mechanism for facilitating adjusting the spacing between the plural nodes of the visualization by a first factor independent of adjusting the first size of each of the plural of nodes and providing a signal indicative of the first factor in response thereto, wherein the plural nodes include leaf nodes; and
employing a second mechanism to display an updated visualization in response to the signal, wherein spacing between plural nodes of the updated visualization is adjusted relative to the visualization based on the signal, such that a region defined by a group of leaf nodes, whose spacing therebetween has been adjusted, is shrunk or enlarged based on the first factor.

2. The method of claim 1, further including adjusting spacing between the plural nodes so that one or more of the plural nodes overlap one or more other nodes of the plural nodes by an amount indicated via the first factor.

3. The method of claim 1, wherein the visualization includes a hierarchy visualization.

4. The method of claim 3, wherein the hierarchy visualization includes a tree diagram, and the plural nodes include plural leaf nodes of the tree diagram.

5. The method of claim 4, wherein providing a first mechanism includes providing the first mechanism as a function included in an Application Programming Interface (API), wherein the API is callable via one or more functions of the second mechanism, and wherein the second mechanism includes a Graphical User Interface (GUI) incorporated as part of a software program.

6. The method of claim 4, further including simultaneously adjusting spacing between plural leaf nodes of the tree diagram in accordance with the factor such that plural leaf nodes of the tree diagram overlap by an amount based on the first factor, resulting in overlapping leaf nodes arranged in a leaf stack in response thereto.

7. The method of claim 6, further including providing a first user interface control responsive to user input to adjust the first factor.

8. The method of claim 7, wherein the first user interface control includes a slider user interface control.

9. The method of claim 6, further including determining the first factor based on a zoom level characterizing a user interface display screen used by the second mechanism to display the tree diagram.

10. The method of claim 6, wherein the overlapping leaf nodes include a group of sibling leaf nodes, and wherein simultaneously adjusting spacing includes shrinking a size of a region occupied by the overlapping leaf nodes when the first factor indicates compression and increasing a size of a region occupied by the overlapping leaf nodes when the first factor indicates expansion by decreasing or increasing spacing between overlapping leaf nodes in accordance with the first factor.

11. The method of claim 6, further including adjusting spacing between plural parent nodes in accordance with a second factor provided to the second mechanism.

12. The method of claim 11, further including providing a second user interface control responsive to user input to adjust the second factor.

13. The method of claim 11, further including automatically adjusting the second factor and one or more spacings between one or more parent nodes based on the first factor.

14. The method of claim 6, further including providing a user option to adjust a transparency of one or more leaf nodes of a leaf stack.

15. The method of claim 6, further including providing a user option to sort a leaf stack in accordance with a first criterion.

16. The method of claim 6, further including adjusting a size of a leaf based on a second criterion and in accordance with a third factor, such that the leaf is a different size that one or more siblings of the leaf.

17. The method of claim 6, further including abbreviating text of a node when a first node is partly occluded by a second node that overlaps the first node.

18. The method of claim 6, further including limiting overlap between leaf nodes in accordance with a size of a text string in one or more of the leaf nodes.

19. An apparatus comprising:
a digital processor coupled to a display and to a processor-readable storage device, wherein the processor-readable storage device includes one or more instructions executable by the digital processor to perform the following acts:
receiving a visualization including a plural of nodes each having a first size and spacing therebetween configured to allow the visualization to be contained within a region of a display;
providing a first mechanism for facilitating adjusting the spacing between the plural nodes of the visualization by a first factor independent of adjusting the first size of each of the plural of nodes and providing a signal indicative of the first factor in response thereto, wherein the plural nodes include leaf nodes; and
employing a second mechanism to display an updated visualization in response to the signal, wherein spacing between plural nodes of the updated visualization is adjusted relative to the visualization based on the signal, such that a region defined by a group of leaf nodes, whose spacing therebetween has been adjusted, is shrunk or enlarged based on the first factor.

20. A processor-readable storage device including instructions executable by a digital processor, the processor-readable storage device including one or more instructions for:
receiving a visualization including a plural of nodes each having a first size and spacing therebetween configured to allow the visualization to be contained within a region of a display;
providing a first mechanism for facilitating adjusting the spacing between the plural nodes of the visualization by a first factor independent of adjusting the first size of each of the plural of nodes and providing a signal indicative of the first factor in response thereto, wherein the plural nodes include leaf nodes; and
employing a second mechanism to display an updated visualization in response to the signal, wherein spacing between plural nodes of the updated visualization is adjusted relative to the visualization based on the signal, such that a region defined by a group of leaf nodes, whose spacing therebetween has been adjusted, is shrunk or enlarged based on the first factor.

* * * * *

UNITED STATES PATENT AND TRADEMARK OFFICE
CERTIFICATE OF CORRECTION

PATENT NO.        : 8,949,742 B2                                   Page 1 of 1
APPLICATION NO.   : 13/688010
DATED             : February 3, 2015
INVENTOR(S)       : Molesky et al.

It is certified that error appears in the above-identified patent and that said Letters Patent is hereby corrected as shown below:

In the drawings,

On sheet 2 of 9, in FIG. 2, under reference numeral 80, line 9, delete "transparey" and insert -- transparency --, therefor.

In the specification,

In column 1, line 11, delete "specification:" and insert -- specification. --, therefor.

In column 9, line 16, delete "nodes 162" and insert -- nodes 162. --, therefor.

Signed and Sealed this
Twenty-fourth Day of November, 2015

Michelle K. Lee
*Director of the United States Patent and Trademark Office*